US008017038B2

(12) United States Patent
Lee et al.

(10) Patent No.: US 8,017,038 B2
(45) Date of Patent: Sep. 13, 2011

(54) GREEN PHOSPHOR AND PLASMA DISPLAY PANEL INCLUDING THE SAME

(75) Inventors: Young-Hun Lee, Suwon-si (KR); Ick-Kyu Choi, Suwon-si (KR); Young-Ki Kim, Suwon-si (KR); Jay-Hyok Song, Suwon-si (KR); Yu-Mi Song, Suwon-si (KR); Young-Kwan Kim, Suwon-si (KR); Soon-Rewl Lee, Suwon-si (KR); Yoon-Chang Kim, Suwon-si (KR); Dong-Sik Zang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/647,264

(22) Filed: Dec. 24, 2009

(65) Prior Publication Data

US 2011/0057148 A1 Mar. 10, 2011

Related U.S. Application Data

(60) Provisional application No. 61/240,104, filed on Sep. 4, 2009.

(51) Int. Cl.
*C09K 11/70* (2006.01)
*C09K 11/08* (2006.01)
*H01J 29/10* (2006.01)

(52) U.S. Cl. ............ 252/301.4 P; 252/301.4 R; 313/468

(58) Field of Classification Search ........... 252/301.4 R, 252/301.4 F, 301.4 P; 313/467, 468, 504, 313/231.31
See application file for complete search history.

(56) References Cited

U.S. PATENT DOCUMENTS

| 5,424,006 | A | * | 6/1995 | Murayama et al. | ..... | 252/301.4 R |
| 5,770,111 | A | * | 6/1998 | Moriyama et al. | ..... | 252/301.4 R |
| 2004/0062951 | A1 | * | 4/2004 | Kita et al. | ..... | 428/690 |
| 2004/0183439 | A1 | | 9/2004 | Aoki et al. | | |
| 2006/0158090 | A1 | | 7/2006 | Wang et al. | | |
| 2007/0046176 | A1 | * | 3/2007 | Bukesov et al. | ..... | 313/496 |
| 2008/0124288 | A1 | * | 5/2008 | Thevenet | ..... | 424/63 |
| 2009/0072255 | A1 | * | 3/2009 | Takahashi et al. | ..... | 257/98 |

FOREIGN PATENT DOCUMENTS

EP 0 710 709 A1 5/1996

(Continued)

OTHER PUBLICATIONS

European Search Report dated Apr. 22, 2010, for corresponding European Patent application 09181000.2., noting listed references in this IDS.

(Continued)

*Primary Examiner* — Jerry Lorengo
*Assistant Examiner* — Lynne Edmondson
(74) *Attorney, Agent, or Firm* — Christie, Parker & Hale, LLP

(57) ABSTRACT

A green phosphor, a plasma display panel (PDP) including the same, and a method for making the same. In one example, the green phosphor includes strontium (Sr); aluminum (Al); europium (Eu); and at least one element (M) selected from the group consisting of phosphorous (P), arsenic (As), antimony (Sb), and bismuth (Bi).

17 Claims, 3 Drawing Sheets

FOREIGN PATENT DOCUMENTS

| | | |
|---|---|---|
| EP | 1 607 462 A1 | 12/2005 |
| KR | 10-2004-0027922 A | 4/2004 |
| KR | 10-2004-0082543 A | 9/2004 |
| KR | 10-2006-0079989 A | 7/2006 |
| KR | 10-2007-0049538 A | 5/2007 |
| KR | 10-2008-0066281 A | 7/2008 |

OTHER PUBLICATIONS

Ravichandran, D., et al., *Crystal chemistry and luminescence of the $Eu^{2+}$-activated alkaline earth aluminate phospors*, Displays, vol. 19, (1999), pp. 197-203, XP-002575641.

* cited by examiner

GREEN PHOSPHOR AND PLASMA DISPLAY PANEL INCLUDING THE SAME

CROSS-REFERENCE TO RELATED APPLICATION

This application claims priority to and the benefit of Provisional Patent Application No. 61/240,104, filed in the U.S. Patent and Trademark Office on Sep. 4, 2009, the entire content of which is incorporated herein by reference.

BACKGROUND (a) Field

This following description relates to a green phosphor and a plasma display panel (PDP) including the same.

(b) Description of the Related Art

Phosphor is a material that receives energy such as light energy or electric energy from the exterior and emits light of a visible spectrum that is perceivable with the eyes of a human being. Phosphor may be used for such electronic devices as plasma display panel (PDP), field emission display (FED) and light emitting diode (LED), and it may dominate the light emission characteristics and color characteristics of the electronic devices.

A PDP is a display device that may display an image by exciting phosphor with vacuum ultraviolet (VUV) rays generated by gas discharge in discharge cells of the PDP.

A phosphor layer of the PDP contains red, green and blue phosphors. As for the green phosphor, $Zn_2SiO_4$:Mn and $YBO_3$:Tb are generally used.

$Zn_2SiO_4$:Mn has excellent light emitting luminance and decay time characteristics. However, this green phosphor is relatively weak against ion impact that not only shortens its life-span but also increases discharge initiation voltage so that discharge may not occur in low gray levels. $YBO_3$:Tb is stronger against ion impact than $Zn_2SiO_4$:Mn and has a lower discharge initiation voltage, but it has a relatively low light luminance and inferior color characteristics.

SUMMARY

An aspect of an embodiment of the present disclosure is directed toward an improved green phosphor that is free from phosphorescence to reduce an afterglow effect, and/or has relatively high light luminance, good color characteristics and/or low temperature degradation.

Another aspect of an embodiment of the present invention is directed toward a plasma display panel (PDP) including the improved green phosphor.

According to an embodiment of the present invention, a green phosphor is provided to include strontium (Sr); aluminum (Al); europium (Eu); and at least one element (M) selected from the group consisting of phosphorous (P), arsenic (As), antimony (Sb), and bismuth (Bi).

In one embodiment, the green phosphor is represented by the following Chemical Formula 1.

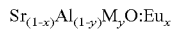  [Chemical Formula 1]

In the above Chemical Formula I, x is between about 0.01 and about 0.3, and y is between about 0.01 and about 0.1. In one embodiment, y is between about 0.05 and about 0.1. In one embodiment, the value of x can be $0.01 \leq x \leq 0.3$, and the value of y can be $0.01 \leq y \leq 0.2$. In one embodiment, the value of x can be $0.01 < x < 0.3$, and the value of y can be $0.01 < y < 0.2$. In one embodiment, the value of y can be $0.05 \leq y \leq 0.1$. In one embodiment, the value of y can be $0.05 < y < 0.1$.

In one embodiment, the green phosphor has an International Commission on Illumination (CIE) X-color coordinate at between about 0.280 and about 0.299 and a CIE Y-color coordinate at between about 0.580 and about 0.599.

In one embodiment, the green phosphor has a decay time of less than about 1 ms. In one embodiment, the decay time of the green phosphor is between about 0.5 ms and about 1 ms.

In one embodiment, the at least one element (M) is in the green phosphor as a dopant.

The at least one element (M) may be distributed throughout the green phosphor.

In one embodiment, the at least one element (M) is coated as a surface of the green phosphor.

The at least one element (M) may be partially distributed through a portion of the green phosphor.

The green phosphor may be applicable to a PDP.

According to another embodiment of the present invention, a PDP including the above described green phosphor is provided.

According to yet another embodiment of the present invention, a method (e.g., a doping method) of forming a green phosphor is provided. This method includes combining strontium (Sr), aluminum (Al), europium (Eu), and at least one element (M) selected from the group consisting of phosphorous (P), arsenic (As), antimony (Sb), and bismuth (Bi) to prepare a phosphor mixture; and heating the phosphor mixture to form the green phosphor.

In one embodiment, a portion of the aluminum (Al) is substituted with the at least one element (M) to form the green phosphor.

According to yet another embodiment of the present invention, a method (e.g., a coating method) of forming a green phosphor is provided. This method includes combining strontium (Sr), aluminum (Al), and europium (Eu) to prepare a phosphor mixture; heating the phosphor mixture; coating at least one element (M) selected from the group consisting of phosphorous (P), arsenic (As), antimony (Sb), and bismuth (Bi) onto a surface of the heated phosphor mixture; and heating the at least one element (M) with the phosphor mixture to form the green phosphor.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
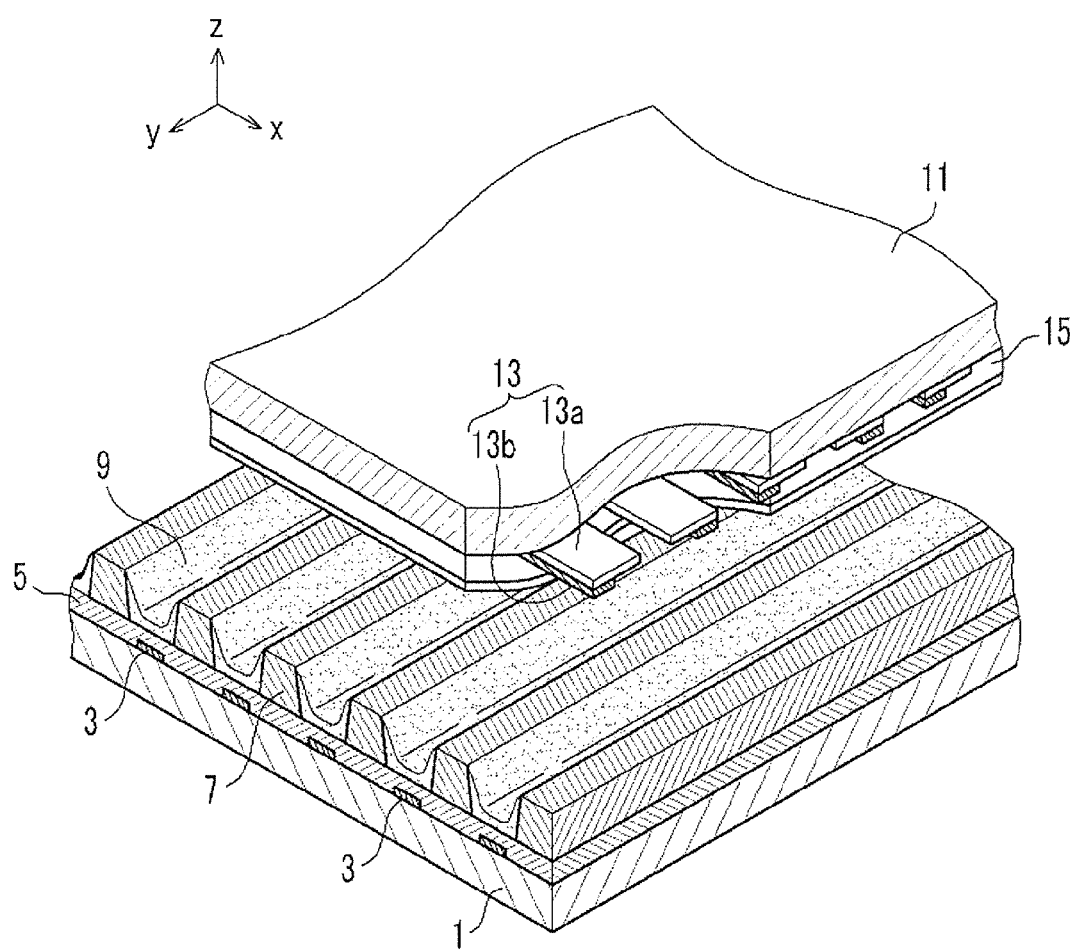
FIG. 1 is a partially exploded perspective view of a plasma display panel (PDP) according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

Hereinafter, a green phosphor according to one embodiment of the present invention is described in more detail.

Here, the green phosphor includes strontium (Sr); aluminum (Al); europium (Eu); and at least one element (M)

selected from the group consisting of phosphorous (P), arsenic (As), antimony (Sb), and bismuth (Bi).

The at least one element (M) may be entirely and uniformly distributed throughout the green phosphor. Alternately, the at least one element (M) may be distributed in part of the green phosphor.

In one embodiment, the at least one element (M) is in the green phosphor as a dopant. In another embodiment, the at least one element (M) is coated as a surface of the green phosphor.

In the above described green phosphor, a portion where the at least element (M) is distributed may be represented by the following Chemical Formula 1.

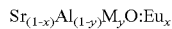 [Chemical Formula 1]

$Sr_{(1-x)}Al_{(1-y)}M_yO:Eu_x$

In the above Chemical Formula I, x is between about 0.01 and about 0.3, and y is between about 0.01 and about 0.1. In one embodiment, y is between about 0.05 and about 0.1. In one embodiment, the value of x can be $0.01 \leq x \leq 0.3$, and the value of y can be $0.01 \leq y \leq 0.2$. In one embodiment, the value of x can be $0.01 < x < 0.3$, and the value of y can be $0.01 < y < 0.2$. In one embodiment, the value of y can be $0.05 \leq y \leq 0.1$. In one embodiment, the value of y can be $0.05 < y < 0.1$. Here, in one embodiment, if y is less then 0.1, then there may not be enough of the at least one element M to remove phosphorescence generation of the green phosphor and/or to protect the green phosphor for heat degradation. By contrast, in another embodiment, if y is greater than 0.2, then the light luminance (or intensity) may be reduced.

That is, in one embodiment, the at least one element (M) selected from the group consisting of P, As, Sb and Bi exists in a form where it substitutes a part of the aluminum (Al), and the europium (Eu) serves as an activator.

Here, the above described green phosphor has relatively high luminous efficiency and short decay time. In the context of embodiments of the present invention, the decay time refers to the time taken for light quantity emitted from the phosphor to be reduced to a tenth of the initial light quantity right after the termination of excitement. The green phosphor has a decay time of less than about 1 ms, and, in one embodiment, between about 0.5 ms and about 1 ms. Therefore, it may be usefully used for a three dimensional (3D) stereoscopic image device.

Also, since a green phosphor as described above and according to an embodiment of the present invention has an International Commission on Illumination (CIE) X-color coordinate at between about 0.280 and about 0.299 and a CIE Y-color coordinate at between about 0.580 and about 0.599, it has relatively good green characteristics.

Also, since a green phosphor as described above and according to an embodiment of the present invention has some of its aluminum substituted with the at least one element (M) selected from the group consisting of P, As, Sb and Bi, it is possible to remove phosphorescence generated during excitation. Thus, the green phosphor may be used usefully in a plasma display panel (PDP). That is, when a phosphor generating phosphorescence is applied to a PDP, afterglow remains even after an image is changed, thereby degrading display characteristics. However, with the above described green phosphor, afterglow is removed, thereby improving the display characteristics.

Also, since a green phosphor as described above and according to an embodiment of the present invention has some of its aluminum substituted with the at least one element (M) selected from the group consisting of P, As, Sb and Bi, degradation caused by heat is reduced or prevented. Therefore, it is possible to reduce or prevent luminance from being deteriorated at high temperature.

In one embodiment, a green phosphor as described above is formed by utilizing a doping method. Here, this doping method includes the steps of combining strontium (Sr), aluminum (Al), europium (Eu), and at least one element (M) selected from the group consisting of phosphorous (P), arsenic (As), antimony (Sb), and bismuth (Bi) to prepare a phosphor mixture; and heating the phosphor mixture to form the green phosphor.

In another embodiment, a green phosphor as described above is formed by utilizing a coating method. Here, this coating method includes the steps of combining strontium (Sr), aluminum (Al), and europium (Eu) to prepare a phosphor mixture; heating the phosphor mixture; coating at least one element (M) selected from the group consisting of phosphorous (P), arsenic (As), antimony (Sb), and bismuth (Bi) onto a surface of the heated phosphor mixture; and heating the at least one element (M) with the phosphor mixture to form the green phosphor.

Here, in embodiments of the present invention, a green phosphor as described above can be utilized for all electronic devices that include a phosphor for displaying green color, such as a PDP, a field emission display and a light emitting diode.

Hereinafter, an exemplary PDP that includes a green phosphor as described above and according to an embodiment of the present invention will be described in more detail by referring to FIG. 1.

In FIG. 1, the thickness of certain layers, films, panels, regions, etc., are exaggerated for clarity reasons. Like reference numerals designate like elements throughout the specification. It will be understood that when an element such as a layer, film, region, or substrate is referred to as being "on" another element, it can be directly on the other element or be indirectly on the other element with one or more intervening elements interposed therebetween. In contrast, when an element is referred to as being "directly on" another element, there are no intervening elements present therebetween.

Here, FIG. 1 is a partially exploded perspective view of the exemplary PDP.

Referring to FIG. 1, the PDP includes a first substrate 1 and a second substrate 11 that are disposed substantially in parallel with each other with a certain or predetermined distance therebetween.

On the surface of the first substrate 1, a plurality of address electrodes 3 are disposed in one direction (the Y direction in FIG. 1), and a first dielectric layer 5 is disposed covering the address electrodes 3. A plurality of barrier ribs 7 are formed on the first dielectric layer 5 between the address electrodes 3 at a certain or predetermined height to form a plurality of discharge space.

The barrier ribs 7 may be formed to have any suitable shape, as long as the shapes can partition the discharge spaces. In addition, the barrier ribs 7 can have various suitable patterns. For example, the barrier ribs 7 may be formed as an open-type having, e.g., a stripe shape pattern or as a closed type having, e.g., a waffle, matrix, or delta shape pattern. Also, the closed-type barrier ribs may be formed such that a horizontal cross-section of the discharge space is a polygon such as a quadrangle, a triangle, or a pentagon; or is a circle; or is an oval.

In addition, red (R), green (G), and blue (B) phosphor layers 9 are disposed in discharge cells 7R, 7G, and 7B formed between the barrier ribs 7. The green phosphor layer includes the above described green phosphor.

Display electrodes 13, including pairs of transparent electrodes 13a and bus electrodes 13b, are disposed in a direction crossing the address electrodes 3 (an X direction in FIG. 1) on one surface of a second substrate 11 facing the first substrate 1. Also, a dielectric layer 15 is disposed on the surface of the second substrate 11 while covering the display electrodes 13. Here, each of the display electrodes 13 includes a pair of a corresponding one of the transparent electrodes 13a and a corresponding one of the bus electrodes 13b.

Discharge cells are formed at cross regions where the address electrodes 3 are crossed by the display electrodes 13.

With the above-described structure, address discharge is performed by applying an address voltage (Va) to a space between the address electrodes 3 and any one discharge sustain electrode 13. When a sustain voltage (Vs) is applied to a space between a pair of discharge sustain electrodes 13, an exciting source generated from the sustain discharge excite a corresponding phosphor layer 9 to thereby emit visible light through the transparent second substrate 11. A representative example of the exciting source is a vacuum ultraviolet ray (VUV).

The following examples illustrate the present invention in more detail. However, it is understood that the present invention is not limited by these examples.

EXAMPLES

Strontium oxide, alumina, a precursor of an M element (M element was one selected from among phosphorous (P), arsenic (As), antimony (Sb) and bismuth (Bi)), and europium oxide were mixed according to their chemical equivalent, and mixed with 0.5 wt % of flux $AlF_3$, and baked at (or heated to) 1400° C. in a reduction atmosphere for 2 hours 30 minutes to thereby produce a baked (or heat treated) mixture. As for the precursor of the M element, $P_2O_5$, $As_2O_5$, $Sb_2O_5$ and $Bi_2O_3$ have been used, individually. Subsequently, the baked mixture was pulverized, rinsed, dried and sieved to thereby prepare $Sr_{0.8}Al_{(1-y)}M_yO:Eu_{0.2}$ phosphor wherein M and y were as presented in the following Table 1.

TABLE 1

|  | M | y |
| --- | --- | --- |
| Example 1-1 | P | 0.05 |
| Example 1-2 |  | 0.075 |
| Example 1-3 |  | 0.1 |
| Example 2-1 | As | 0.05 |
| Example 2-2 |  | 0.075 |
| Example 2-3 |  | 0.1 |
| Example 3-1 | Sb | 0.05 |
| Example 3-2 |  | 0.075 |
| Example 3-3 |  | 0.1 |
| Example 4-1 | Bi | 0.05 |
| Example 4-2 |  | 0.075 |
| Example 4-3 |  | 0.1 |

Comparative Example 1

Strontium oxide, alumina and europium oxide were mixed according to their chemical equivalent, mixed with 0.5 wt % of flux $AlF_3$, and baked at 1400° C. in a reduction atmosphere for 2 hours 30 minutes to thereby produce a baked mixture. Subsequently, the baked mixture was pulverized, rinsed, dried and sieved to thereby prepare $Sr_{0.8}Al_2O:Eu_{0.2}$ phosphor.

Comparative Example 2

Yttrium oxide, alumina and cerium oxide were mixed according to their chemical equivalent, mixed with 3.0 wt % of flux $BaF_3$, and baked at 1600° C. in a reduction atmosphere for 3 hours to thereby produce a baked mixture. Subsequently, the baked mixture was pulverized, rinsed, dried and sieved to thereby prepare $Y_{2.97}Al_5O_{12}:Ce_{0.03}$ phosphor.

Evaluation-1

Decay time spectrum of the phosphor prepared according to Example 1-1 was measured.

Figure 2:
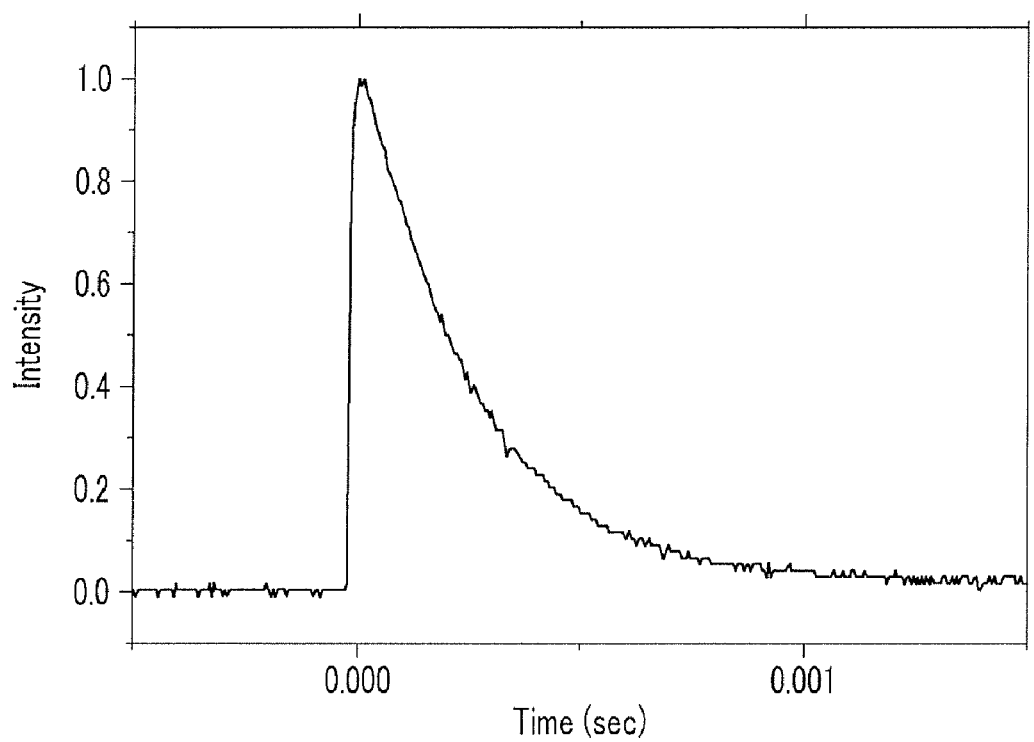
FIG. 2 is a graph showing decay time spectrum of the phosphor according to Example 1-1.

FIG. 2 is a graph showing decay time spectrum of the phosphor according to Example 1-1.

As shown in FIG. 2, the phosphor according to Example 1-1 has a short decay time of less than about 1 ms (0.001 s).

Evaluation-2

Absorption spectra of the phosphor prepared according to Example 1-1 was measured.

Figure 3:
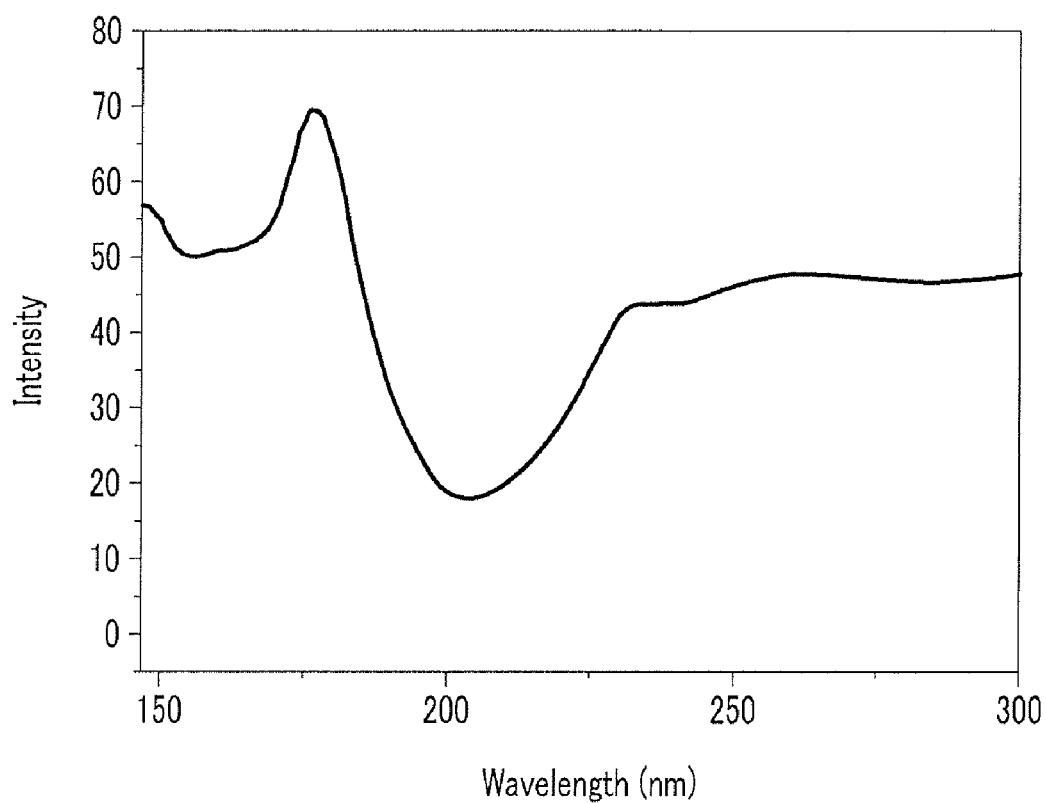
FIG. 3 is a graph showing absorption spectra of the phosphors according to Example 1-1 and Comparative Example 2.

FIG. 3 is a graph showing absorption spectra of the phosphors according to Example 1-1.

Referring to FIG. 3, the phosphor A prepared according to Example 1-1 shows a relatively high absorption spectrum at between about 147 nm and about 172 nm. This is wavelength region of light generated from excitation when xenon (Xe) gas is used as a discharge gas in a PDP, and it can be seen that using xenon as a discharge gas is appropriate for a PDP.

Evaluation-3

CIE color coordinates, luminance and phosphorescence of the phosphors prepared according to the Examples and the Comparative Examples were measured and presented in the following Table 2. The luminances of the phosphors were relatively assessed by taking the luminance of the phosphor prepared according to Comparative Example 2 as 100%.

TABLE 2

|  | CIE X | CIE Y | Luminance (%) | phosphorescence |
| --- | --- | --- | --- | --- |
| Example 1-1 | 0.293 | 0.582 | 108 | NO |
| Example 1-2 | 0.292 | 0.582 | 110 | NO |
| Example 1-3 | 0.294 | 0.582 | 108 | NO |
| Example 2-1 | 0.287 | 0.590 | 98 | NO |
| Example 2-2 | 0.286 | 0.589 | 96 | NO |
| Example 2-3 | 0.286 | 0.589 | 80 | NO |
| Example 3-1 | 0.288 | 0.591 | 89 | NO |
| Example 3-2 | 0.289 | 0.591 | 85 | NO |
| Example 3-3 | 0.288 | 0.591 | 80 | NO |
| Example 4-1 | 0.292 | 0.581 | 100 | NO |
| Example 4-2 | 0.292 | 0.580 | 90 | NO |
| Example 4-3 | 0.291 | 0.581 | 85 | NO |
| Comparative Example 1 | 0.284 | 0.590 | 75 | YES |
| Comparative Example 2 | 0.421 | 0.556 | 100 | NO |

Table 2 shows that the phosphor according to each of the Examples had similar color coordinates to that of the Comparative Example 1 and has relatively high luminance while still not generating phosphorescence. Also, the phosphor of each of the Examples had relatively good color characteristics, as compared with the phosphor of Comparative Example 2.

Evaluation-4

The phosphors prepared according to Example 1-1 and Comparative Example 1 were thermally treated at about 600° C. and their CIE color coordinates, luminance and phosphorescence were measured and presented in the following Table 3. The luminances of the phosphors were relatively assessed by taking the luminance of the phosphor prepared according to Comparative Example 2 as 100%.

TABLE 3

| | | CIE x | CIE y | Luminance (%) | phosphorescence |
|---|---|---|---|---|---|
| Example 1-1 | Before heat treatment | 0.292 | 0.582 | 110 | NO |
| | After heat treatment | 0.292 | 0.582 | 108 | NO |
| Comparative Example 1 | Before heat treatment | 0.284 | 0.590 | 109 | YES |
| | After heat treatment | 0.306 | 0.496 | 8 | NO |

Table 3 shows that after the thermal treatment at 600° C., the phosphor according to Example 1-1 substantially maintained its color coordinates and luminance, while the phosphor of the Comparative Example 1 showed changed color coordinates and remarkably deteriorated luminance.

Therefore, it can be seen that the phosphor prepared according to Example 1-1 is stable against heat.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A green phosphor comprising a compound represented by the following chemical formula, $Sr_{(1-x)}Al_{(1-y)}M_yO:Eu_x$, wherein, x is between about 0.01 and about 0.3, and y is between about 0.01 and about 0.2,
wherein M is at least one element selected from the group consisting of phosphorous (P), arsenic (As), antimony (Sb), and bismuth (Bi).

2. The green phosphor of claim 1, wherein y is between about 0.05 and about 0.1.

3. The green phosphor of claim 1, wherein the green phosphor has an International Commission on Illumination (CIE) X-color coordinate at between about 0.280 and about 0.299 and a CIE Y-color coordinate at between about 0.580 and about 0.599.

4. The green phosphor of claim 1, wherein the green phosphor has a decay time of less than about 1 ms.

5. The green phosphor of claim 4, wherein the decay time of the green phosphor is between about 0.5 ms and about 1 ms.

6. The green phosphor of claim 1, wherein the element (M) is in the green phosphor as a dopant.

7. The green phosphor of claim 1, wherein the element (M) is coated onto a surface of the green phosphor.

8. The green phosphor of claim 1, wherein the element (M) is adapted to substitute a portion of the aluminum (Al), and wherein the aluminum (Al) has been substituted with sufficient amount of the element (M) to remove phosphorescence generation of the green phosphor.

9. A plasma display panel (PDP) comprising a phosphor layer composed of a green phosphor comprising a compound represented by the following chemical formula, $Sr_{(1-x)}Al_{(1-y)}M_yO:Eu_x$, wherein, x is between about 0.01 and about 0.3, and y is between about 0.01 and about 0.2,
wherein M is at least one element selected from the group consisting of phosphorous (P), arsenic (As), antimony (Sb), and bismuth (Bi).

10. The plasma display panel (PDP) of claim 9, wherein y is between about 0.05 and about 0.1.

11. The plasma display panel (PDP) of claim 9, wherein the green phosphor has an International Commission on Illumination (CIE) X-color coordinate at between about 0.280 and about 0.299 and a CIE Y-color coordinate at between about 0.580 and about 0.599.

12. The plasma display panel (PDP) of claim 9, wherein the green phosphor has a decay time of less than about 1 ms.

13. The plasma display panel (PDP) of claim 12, wherein the decay time of the green phosphor is between about 0.5 ms and about 1 ms.

14. The plasma display panel (PDP) of claim 9, wherein the element (M) is in the green phosphor as a dopant.

15. The plasma display panel (PDP) of claim 9, wherein the element (M) is coated onto a surface of the green phosphor.

16. The plasma display panel (PDP) of claim 9, wherein the element (M) is adapted to substitute a portion of the aluminum (Al), and wherein the aluminum (Al) has been substituted with sufficient amount of the element (M) to remove phosphorescence generation of the green phosphor.

17. A method of forming a green phosphor represented by the following chemical formula, $Sr_{(1-x)}Al_{(1-y)}M_yO:Eu_x$, wherein, x is between about 0.01 and about 0.3, y is between about 0.01 and about 0.2, and M is an element;
the method comprising:
combining strontium (Sr), aluminum (Al), europium (Eu), and at least one element (M) selected from the group consisting of phosphorous (P), arsenic (As), antimony (Sb), and bismuth (Bi) to prepare a phosphor mixture; and
heating the phosphor mixture to form the green phosphor.

* * * * *